US012140233B2

(12) United States Patent
Otte et al.

(10) Patent No.: US 12,140,233 B2
(45) Date of Patent: *Nov. 12, 2024

(54) HIGH-PRESSURE PRIMING VALVE (71) Applicant: MICROFLUIDICS INTERNATIONAL CORPORATION, Westwood, MA (US)

(72) Inventors: Rachel Otte, Mansfield, MA (US); Ahmad Shehata, Denver, CO (US); Jocemar Ramina, Lexington, MA (US); Marco Catalani, Burlington, MA (US); David Harney, Stoneham, MA (US); John Michael Bernard, Stoughton, MA (US); Michael Ratigan, Scituate, RI (US); Harshit Kumar Patel, Waterloo (CA)

(73) Assignee: IDEX MPT INC., Westwood, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/073,932

(22) Filed: Dec. 2, 2022

(65) Prior Publication Data
US 2023/0109444 A1 Apr. 6, 2023

Related U.S. Application Data

(63) Continuation of application No. 17/326,667, filed on May 21, 2021, now Pat. No. 11,519,512.
(Continued)

(51) Int. Cl.
*F16K 11/04* (2006.01)
*F16K 1/12* (2006.01)
(Continued)

(52) U.S. Cl.
CPC ............. *F16K 11/04* (2013.01); *F16K 1/12* (2013.01); *F16K 25/005* (2013.01);
(Continued)

(58) Field of Classification Search
CPC ...... F16K 11/04; F16K 1/465; F16K 27/0263; F16K 24/04; Y10T 137/8667;
(Continued)

(56) References Cited

U.S. PATENT DOCUMENTS 1,590,323 A * 6/1926 Schubert ................ F16K 11/04
137/594
2,478,002 A 8/1949 Mott
(Continued)

FOREIGN PATENT DOCUMENTS

CN 205013717 2/2016

OTHER PUBLICATIONS

PCT Search Report and Written Opinion dated Aug. 24, 2021 issued for International PCT Application No. PCT/US2021/033563.
(Continued)

*Primary Examiner* — Michael R Reid
(74) *Attorney, Agent, or Firm* — K&L Gates LLP (57) ABSTRACT

A new and innovative high-pressure priming valve is provided for use in high-pressure fluid systems that require a high level of fluid purity. The priming valve includes at least three ports, some of which are angled. The priming valve also includes a needle that variably blocks and unblocks a pathway to one of the ports between normal operation and a priming operation, respectively. The priming valve includes a sealing insert positioned below a stack of washers that maintain the needle's alignment in response to high fluid pressures exerted on the needle. The sealing insert helps prevent fluid from contacting the stack of washers, which helps prevent biological growth within the valve. The angled ports help facilitate priming valve drainage to further help prevent biological growth. By helping prevent biological growth, the sealing insert helps prevent fluid contami-
(Continued)

nation and enables the priming valve to be utilized for high-purity fluid applications.

19 Claims, 4 Drawing Sheets

Related U.S. Application Data (60) Provisional application No. 63/028,745, filed on May 22, 2020.

(51) Int. Cl.
| | | |
|---|---|---|
| *F16K 25/00* | (2006.01) | |
| *F16K 27/02* | (2006.01) | |
| *F16K 41/02* | (2006.01) | |
| *F16K 1/36* | (2006.01) | |
| *F16K 1/46* | (2006.01) | |
| *F16K 31/60* | (2006.01) | |

(52) U.S. Cl.
CPC .......... *F16K 27/0263* (2013.01); *F16K 41/02* (2013.01); *F16K 1/36* (2013.01); *F16K 1/465* (2013.01); *F16K 31/60* (2013.01)

(58) Field of Classification Search
CPC ..... Y10T 137/86879; Y10T 137/86509; Y10T 137/87748
See application file for complete search history.

(56) References Cited

U.S. PATENT DOCUMENTS

| | | | | |
|---|---|---|---|---|
| 2,991,800 | A | | 7/1961 | Becker |
| 3,240,230 | A | * | 3/1966 | Callahan, Jr. ............. F16K 1/38 |
| | | | | 251/223 |
| 3,976,279 | A | | 8/1976 | Walker |
| 4,193,420 | A | * | 3/1980 | Hewson .................. F16K 11/22 |
| | | | | 73/201 |
| 4,515,180 | A | | 5/1985 | Napolitano |
| 4,711,268 | A | * | 12/1987 | Coleman ................. F16K 11/22 |
| | | | | 73/756 |
| 4,718,637 | A | | 1/1988 | Contin |
| 6,148,841 | A | * | 11/2000 | Davidson ................ F16K 17/16 |
| | | | | 251/215 |
| 7,972,561 | B2 | | 7/2011 | Viovy et al. |
| 8,367,004 | B2 | | 2/2013 | Panagiotou et al. |
| 10,240,679 | B2 | | 3/2019 | Vu |
| 10,408,353 | B2 | * | 9/2019 | Balmforth ............... F16K 24/02 |
| 11,519,512 | B2 | * | 12/2022 | Otte ....................... F16K 11/04 |
| 2015/0362080 | A1 | | 12/2015 | Vu |
| 2017/0059058 | A1 | | 3/2017 | Hemme et al. |

OTHER PUBLICATIONS

Extended European Search Report dated Jun. 3, 2024 issued for European Patent Application No. 21809437.3.

* cited by examiner

HIGH-PRESSURE PRIMING VALVE

PRIORITY

The present application is a continuation application of U.S. patent application Ser. No. 17/326,667 filed on May 21, 2021, which claims the benefit of U.S. Provisional Patent Application No. 63/028,745, filed on May 22, 2020. The entire contents of both applications are incorporated herein by reference.

BACKGROUND

High-pressure fluid systems, such as high-pressure fluid mixers, high-pressure/high sheer fluid processors, high-pressure impinger jet reactors and high-pressure homogenizers, may make use of a high-pressure priming valve to prepare the system for production mode. These machines include various systems from Microfluidics International Corporation, a unit of IDEX Corporation located in Westwood, MA, such as lab/benchtop machines, pilot scale machines, and production scale machines. For example, the lab/benchtop machines may include the LM10, the LM20, the M110P, the LV1 Low Volume, M110Y, and HC 5000/8000 product offerings from Microfluidics International Corporation. The pilot scale machines may include, for example, the Pilot Scale M110EH and the Pilot Scale M815 product offerings from Microfluidics International Corporation. The production scale machines may include the M700 and M710 Series product offerings from Microfluidics International Corporation.

A high-pressure fluid system may be primed using a priming valve to remove air from the fluid in the system. Priming the system typically involves setting the fluid system to a low pressure to allow the air in the system's piping to flow out of a priming valve. For instance, priming the system helps reduce the possibility of the air in the fluid combusting when the fluid pressure in the system is increased during production mode. Air combusting may cause system components to burn, such as a seal, which may cause fluid contamination. Accordingly, during a priming operation, the priming valve may be open to allow air from the fluid to escape. During normal operation of the high-pressure fluid system, however, the priming valve may be closed.

One type of high-pressure priming valve is a diaphragm valve. A diaphragm valve uses a cone to seal against an angled surface to prevent fluid from flowing through another port. When the cone is lifted off the surface and allows fluid to flow through the extra port, a diaphragm seals the fluid between the blocks of the valve to prevent leaking and possible biological growth.

A diaphragm valve, however, can pose a number of drawbacks. Diaphragm valves can be complex and difficult to install, thus increasing production time and costs. The complex design of many diaphragm valves may also make it difficult to replace individual components when performing maintenance operations. Additionally, diaphragm valves may be prone to leaks.

Another type of high-pressure priming valve is a needle-type valve configuration. Examples of such needle valves include various high-pressure valves from (1) Haskel, a unit of Ingersoll Rand, (2) High Pressure Equipment Co., located in Erie, PA, and (3) Autoclave Engineers, a unit of Parker located in Erie PA. A needle-type valve may include two or more ports and a needle that variably blocks one or more of the ports. For instance, the needle may block a path to a first port when the valve is closed such that fluid flows from a second port to a third port. The needle may translate to open the valve such that the path to the first port is no longer blocked. For example, air may escape through the first port when the valve is open. Additionally, in high-pressure fluid systems, the needle must remain in a closed position against high pressures from the fluid. The needle-type valve may therefore include a washer stack to help maintain the needle's alignment. The needle-type valve may also typically include a sealing means positioned above the washer stack to help prevent fluid leakage external to the priming valve.

A needle valve is more robust at preventing leaks than a diaphragm valve because there is no elastomer diaphragm to deform with use. The needle valve also aligns on the sealing surface better with the aid of the washers, while the cone in the diaphragm valve may travel more to one side, which can cause faster failures and leaking. Furthermore, the design of a needle valve generally utilizes fewer parts than a diaphragm valve, which reduces the number of components that could potentially fail.

A needle-type valve including the above-described washer stack configuration, however, may allow fluid to flow between the washers in the stack. For instance, the sealing means is typically located above the washer stack. Fluid may therefore get trapped between the washers and may increase the risk of potential biological growth in the valve, which would contaminate the fluid flowing through the valve. Additionally, typical needle-type valves do not facilitate draining of the valve, therefore increasing a risk of biological growth within the valve. The increased risk of biological growth may make such a needle valve configuration less suitable for applications that require fluid sterility, such as pharmaceutical applications.

SUMMARY

The present disclosure provides new and innovative high-pressure priming valves for use in high purity fluid priming applications. In an example, a priming valve includes a first port, a second port, and a third port in fluid communication. The second port and the third port are angled towards the first port. Fluid enters the priming valve through the first port and exits through the second port. The priming valve also includes a needle, a stack of washers, and a sealing insert. The needle blocks a fluid pathway to the third port in a closed configuration and facilitates the fluid pathway in an open configuration. The priming valve is configured such that air contained in the fluid flows along the fluid pathway to the third port when the needle is in the open configuration. The stack of washers surround a portion of the needle. The sealing insert is positioned at the bottom of the stack of washers and is configured to prevent the fluid from contacting the stack of washers.

In another example, a priming valve includes at least three ports in fluid communication. Fluid enters the priming valve through a first port of the at least three ports, and the ports other than the first port are angled towards the first port. The priming valve also includes a needle, a stack of washers, and a sealing insert. The needle blocks a fluid pathway to at least one port of the at least three ports in a closed configuration and facilitates the fluid pathway in an open configuration. The priming valve is configured such that air contained in the fluid flows along the fluid pathway to the at least one port when the needle is in the open configuration. The stack of washers surround a portion of the needle. The sealing insert is positioned at the bottom of the stack of washers and is configured to prevent the fluid from contacting the stack of washers.

In another example still, a high-pressure fluid processor includes a high pressure intensifier pump, a reaction chamber, a prime discharge line, and a priming valve. The high pressure intensifier pump has an inlet and an outlet. The reaction chamber includes microchannels and is adapted to effect at least one of high shear fields or impinging jet reactions on a fluid. The priming valve includes a first port, a second port, and a third port in fluid communication. The second port and the third port are angled towards the first port. Fluid enters the priming valve through the first port and exits through the second port. The priming valve also includes a needle, a stack of washers, and a sealing insert. The needle blocks a fluid pathway to the third port in a closed configuration and facilitates the fluid pathway in an open configuration. The priming valve is configured such that air contained in the fluid flows along the fluid pathway to the third port and to the prime discharge line when the needle is in the open configuration. The stack of washers surround a portion of the needle. The sealing insert is positioned at the bottom of the stack of washers and is configured to prevent the fluid from contacting the stack of washers. Fluid flows along a first fluid path from the high pressure intensifier pump to the first port, along a second fluid path from the first port to the second port, and along a third fluid path from the second port to the reaction chamber.

DETAILED DESCRIPTION

The present disclosure provides new and innovative high-pressure priming valves for use in high-purity fluid priming applications. For instance, the provided priming valve may be a component in a high-pressure fluid system, such as a high-pressure fluid mixer, a high-pressure/high sheer fluid processor, a high-pressure impinger jet reactor, or a high-pressure homogenizer. These example high-pressure fluid systems may be used for applications that have a low tolerance for fluid contamination, such as pharmaceutical applications.

The presently disclosed priming valve may include three ports in fluid communication with one another. In some instances, the priming valve may include more than three ports. The priming valve may also include a needle that can be positioned in a closed configuration and an open configuration. In a closed configuration, the needle blocks a pathway to at least one of the ports. For example, a fluid may flow into a first port and out a second port while the needle blocks the pathway to a third port in a closed configuration. In an open configuration, the needle may translate to unblock the pathway to the third port. The priming valve may be configured such that when the needle is in the open configuration, air contained in the fluid entering the first port escapes out the third port. In this way, the provided priming valve facilitates fluid priming of a system.

The priming valve may also include a stack of washers. The stack of washers may help maintain alignment of the needle. When the needle is in an open configuration during fluid priming, a fluid system is typically at a low pressure. During normal operation, however, the needle must remain in the closed configuration against high pressures (e.g., 30,000-40,000 psi). The washer stack accordingly maintains the needle in a proper alignment and prevents the needle from shifting in response to forces from the high pressures. Typical needle-type priming valves also include a sealing means so that fluid does not leak external to the priming valve. This sealing means is typically positioned above the washer stack, however, and thus fluid is able to flow to the washer stack before reaching the sealing means. Fluid may get stuck in between the washers, which may facilitate potential biological growth in the priming valve. Any biological growth within the priming valve can contaminate the fluid flowing through the ports.

The presently disclosed priming valve is instead particularly adapted for applications that require a high degree of purity, and therefore have a low tolerance for fluid contamination. For example, conventional needle-type priming valves typically utilize the pressure drop across the washer stack to aid in sealing against the needle. The provided priming valve instead includes a sealing insert that is positioned at the bottom of the washer stack. The sealing insert helps prevent fluid from contacting the washer stack. By helping prevent fluid from contacting the washer stack, the sealing insert helps prevent biological growth and helps prevent fluid contamination. Additionally, the provided priming valve includes angled ports. The angled ports may help facilitate easier draining of the priming valve, which may also help prevent biological growth and resulting fluid contamination. The presently disclosed priming valve also has a simpler design and is more cost-effective than typical diaphragm-type priming valves used for high-purity applications. Additional advantages of the provided priming valve will be apparent to one having skill in the art in light of the discussion of the figures below.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Figure 1:
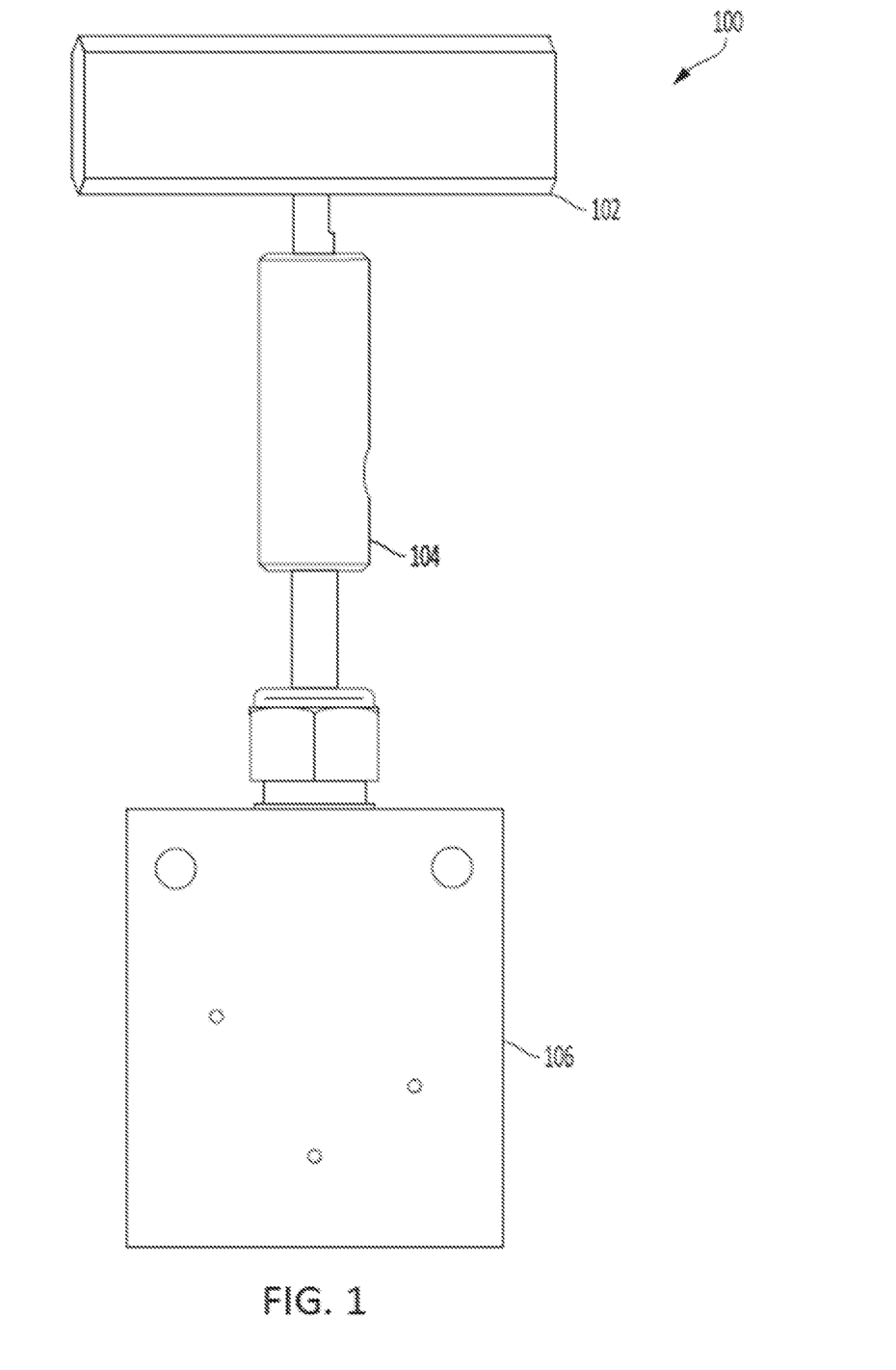
FIG. 1 illustrates an example valve assembly, according to an aspect of the present disclosure.

FIG. 1 illustrates an example valve assembly 100, according to an aspect of the present disclosure. The example valve assembly 100 includes a priming valve 106. Only the outer casing of the priming valve 106 is visible. In at least one example, the outer casing may be constructed of a stainless steel alloy (e.g., 316 stainless steel). The valve assembly 100 may also include a handle 102. In at least one example, the handle 102 may be constructed of aluminum. The handle 102 may be used to adjust the needle of the priming valve 106, for instance, to adjust the needle between an open and closed configuration between fluid priming and normal operation modes, respectively. The valve assembly 100 may also include an extension 104 between the handle 102 and the priming valve 106.

Figure 2:
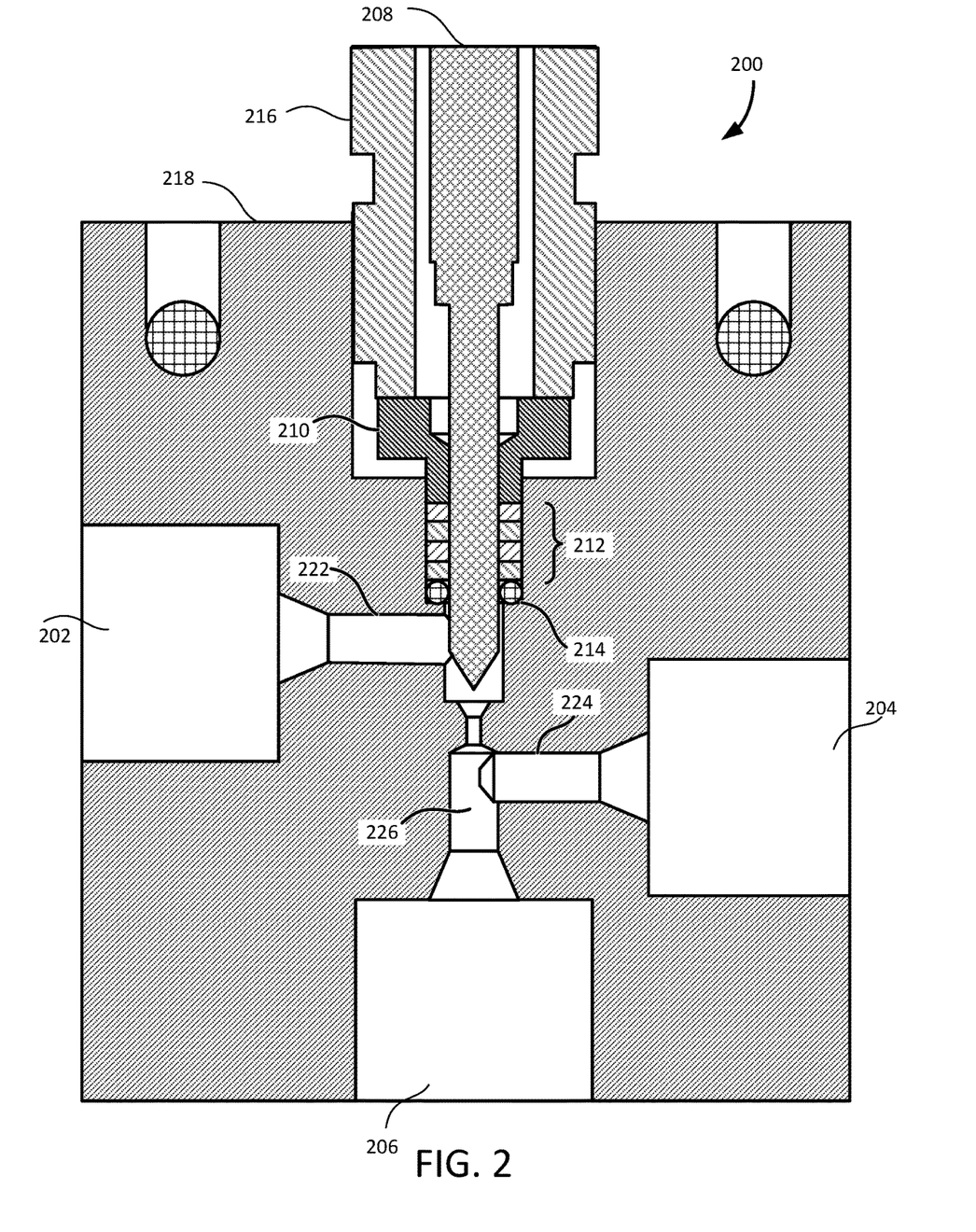
FIG. 2 illustrates a cross section of an example valve, according to an aspect of the present disclosure.

FIG. 2 illustrates a cross section of an example priming valve 200, according to an aspect of the present disclosure. In various aspects, the example priming valve 200 may include a body 218, a port 202, a port 204, and a port 206. Each of the ports 202, 204, 206 may include a tube 222, 224, 226, respectively. The ports 202, 204, 206 may, in various instances, be constructed of a metal (e.g., steel or a steel alloy) or a plastic (e.g., Nylatron®, Teflon® Glass). In other instances, the ports 202, 204, 206 may be constructed of other suitable corrosion-resistant materials. Fluid may enter the priming valve 200 through the port 206. In some examples, each of the interior components of the priming valve 200 may be electropolished and/or passivated.

The example priming valve 200 also includes a needle 208. The needle 208 may, in various instances, be constructed of a metal (e.g., steel or a steel alloy) or a plastic (e.g., Nylatron®, Teflon® Glass). In other instances, the needle 208 may be constructed of other suitable corrosion-resistant materials. The needle 208, in various examples, may be treated with a surface coating, a heat treatment, ion enrichment, or other material treatments. The needle 208 may be adjusted between an open configuration and a closed configuration. In some instances, the needle 208 may be adjusted manually (e.g., with the handle 102). In other instances, the needle 208 may be actuated using a pneumatic, electric, or hydraulic actuator to provide rotation or linear translation.

Figure 4:
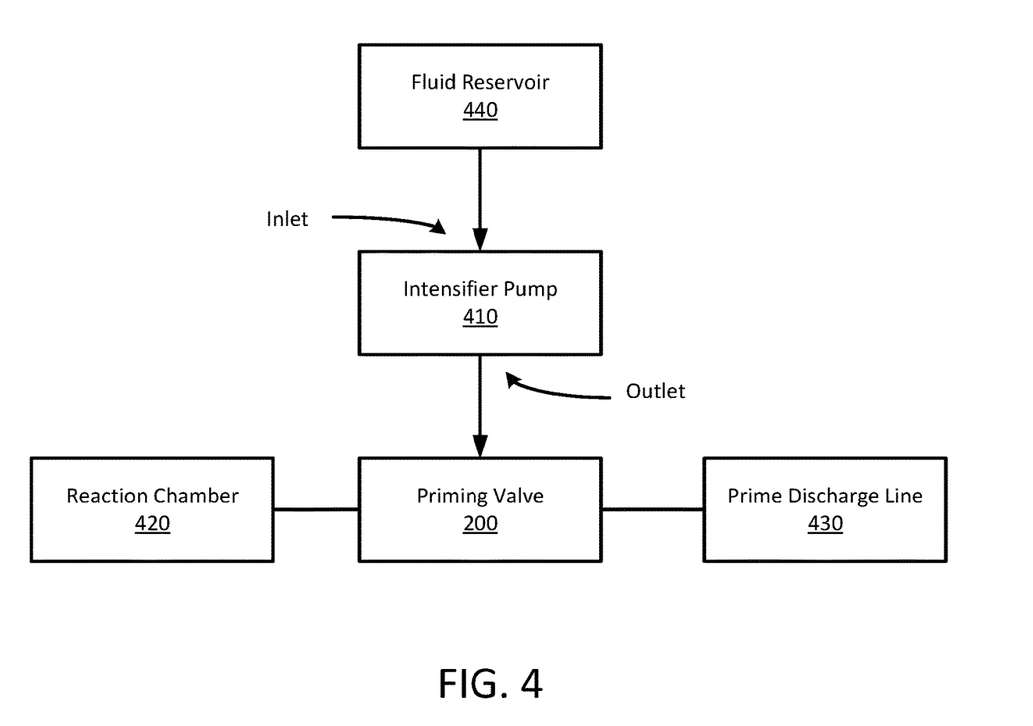
FIG. 4 illustrates a diagram of an example high-pressure fluid processor, according to an aspect of the present disclosure.

The priming valve 200, in various instances, may be a component of a high-pressure fluid, processor 400 as illustrated in FIG. 4, such as a high-pressure fluid mixer, high-pressure/high sheer fluid processor, high-pressure impinger jet reactor, or high-pressure homogenizer. In such instances, the high-pressure fluid, processor 400, in addition to the priming valve 200, may include a high pressure intensifier, pump 410, a reaction chamber 420 including microchannels, a prime discharge, line 430, and a fluid reservoir 440. The fluid reservoir 440 may be fluidly connected to the priming valve 200, for instance to the port 206, via the high-pressure intensifier pump 410 such that fluid flows from the fluid reservoir 440 into the high-pressure intensifier pump 410 and to the priming valve 200. The priming valve 200 may be fluidly connected to the reaction chamber 420 at the port 204. The port 202 may be fluidly connected to the prime discharge line 430.

The high-pressure intensifier pump 410 is adapted to pressurize fluid flowing through the pump 410 to an elevated pressure, for example, at least 5,000 psi. In other examples, the high-pressure intensifier pump 410 may be adapted to pressurize fluid to a pressure between 5,000-50,000 psi, between 10,000-40,000 psi, between 10,000-50,000 psi, between 5,000-40,000 psi, between 5,000-30,000 psi, between 10,000-30,000 psi, between 5,000-25,000 psi, between 10,000-25,000 psi, between 5,000-20,000 psi, between 10,000-20,000 psi, between 30,000-50,000 psi, between 20,000-40,000 psi, between 20,000-50,000 psi, between 15,000-40,000 psi, between 15,000-50,000, and other suitable pressure ranges.

The reaction chamber 420 includes microchannels that are adapted to effect high shear fields on a fluid as the fluid flows through the microchannels. For instance, the microchannels may create high shear fields by being configured with small distances for high-velocity fluid to flow. The microchannel geometries may also change the fluid direction, which can increase the shear rate. The microchannels, in various instances, each have a diameter of 150 microns or less. Additionally, the microchannels may be configured such that they effect shear fields between about 80,000 sec−1 to about 10,000,000 sec−1 on a fluid.

During a priming operation of a fluid system described above, the needle 208 of the priming valve 200 may be in an open configuration such that the needle 208 facilitates a pathway to the port 202. For example, the needle 208 may translate (e.g., away from the port 206) until it no longer blocks the opening to the port 202. The fluid flowing through the valve is pressurized at a lower pressure during a priming operation than normal operation of the fluid system. For instance, in various examples, the fluid pressure may be between 0 to 1000 psi during a priming operation. As fluid flows from the port 206 to the port 204 during a priming operation, the fluid is purged of any existing air as the air escapes through the port 202. For instance, the prime discharge line 430 connected to the port 202 may have a larger diameter than the reaction chamber line connected to the port 204 such that the pathway to the prime discharge line 430 is the path of least resistance for the air.

During normal operation of the fluid system, the needle 208 may be in a closed configuration such that it blocks the fluid pathway to the port 202. For instance, the needle 208 may block the opening to the tube 222 of the port 202. The fluid entering the priming valve 200 at the port 206 therefore exits the priming valve 200 through the port 204. The fluid flowing through the valve is pressurized at a high pressure during normal operation of the fluid system. For instance, in various examples, the fluid pressure may be between 5,000-50,000 psi, between 10,000-40,000 psi, between 10,000-50,000 psi, between 5,000-40,000 psi, between 5,000-30,000 psi, between 10,000-30,000 psi, between 5,000-25,000 psi, between 10,000-25,000 psi, between 5,000-20,000 psi, between 10,000-20,000 psi, between 30,000-50,000 psi, between 20,000-40,000 psi, between 20,000-50,000 psi, between 15,000-40,000 psi, between 15,000-50,000, and other suitable pressure ranges. Accordingly, the example priming valve 200 is configured to withstand the fluid pressures described above.

The high fluid pressure exerted on the needle 208 during normal operation places a high amount of stress on the needle 208. The example priming valve 200 may therefore include a stack of washers 212 that act as a bearing to maintain the alignment of the needle 208. In at least one example, the stack of washers 212 includes four individual washers. In other examples, the stack of washers 212 may include another suitable quantity of washers (e.g., 3, 5, 6, 7, etc.). The priming valve 200 may also include a washer 210 at the top of the stack of washers 212. The washer 210 may help maintain alignment of the needle 208. For instance, without the stack of washers 212 and/or the washer 210, the high fluid pressure applied to the needle 208 may cause the needle to shift. The needle shifting may increase the likelihood of fluid leakage and/or fatigue failure of the needle.

Priming operations as described herein may occur with a fluid that has a higher potential for biological growth. The high fluid pressures during normal operation of the fluid system may cause the fluid to leak or flow through crevices (e.g., between the needle 208 and the wall of the priming valve 200) to reach the stack of washers 212 in typical needle-type valves. For instance, fluid leakage may occur if the needle includes a crack along the needle, or if the needle is not properly tightened or seated on the sealing surface. Fluid may then get trapped between individual washers, or may otherwise remain among the washers, for a sufficient amount of time to facilitate biological growth. If biological growth forms within a valve, fluid flowing through the valve may become contaminated. Because in some instances priming fluid may also be used for the production operation, such contamination may affect both the priming fluid and the production fluid. To prevent fluid from reaching the stack of washers 212, the priming valve 200 includes a sealing insert 214 at the bottom of the stack of washers 212. The washer 210 may aid in compressing the sealing insert 214 when the gland 216 is tightened into the body 218 of the priming valve 200. The configuration of the priming valve 200 therefore helps ensure that fluid flowing through the priming valve 200 is not contaminated.

In one example, the sealing insert 214 may be a washer constructed of Nylatron®. In another example, the sealing insert 214 may be an o-ring (e.g., a USP class IV classification o-ring that has a pharmaceutical grade certification). In other examples, the sealing insert 214 may have another suitable configuration that prevents highly pressurized fluid from flowing past the sealing insert 214. In various instances, the sealing insert 214 may be made from rubber, an elastomer, or a plastic, such as Nitrile, EPDM, Fluoroelastomers—FKM (e.g., Viton®), Neoprene, UHMWPE, PEEK, Polytetrafluoroethylene—PTFE (e.g., Teflon®), Perfluoroelastomer—FFKM (e.g., Kalrez®), silicone, or other suitable elastomers or plastics. In other instances, the sealing insert 214 may be made from a metal, such as steel, stainless steel, metal alloys, or other suitable metals. In other instances still, the sealing insert 214 may be made from other suitable materials for high-pressure applications.

Figure 3:
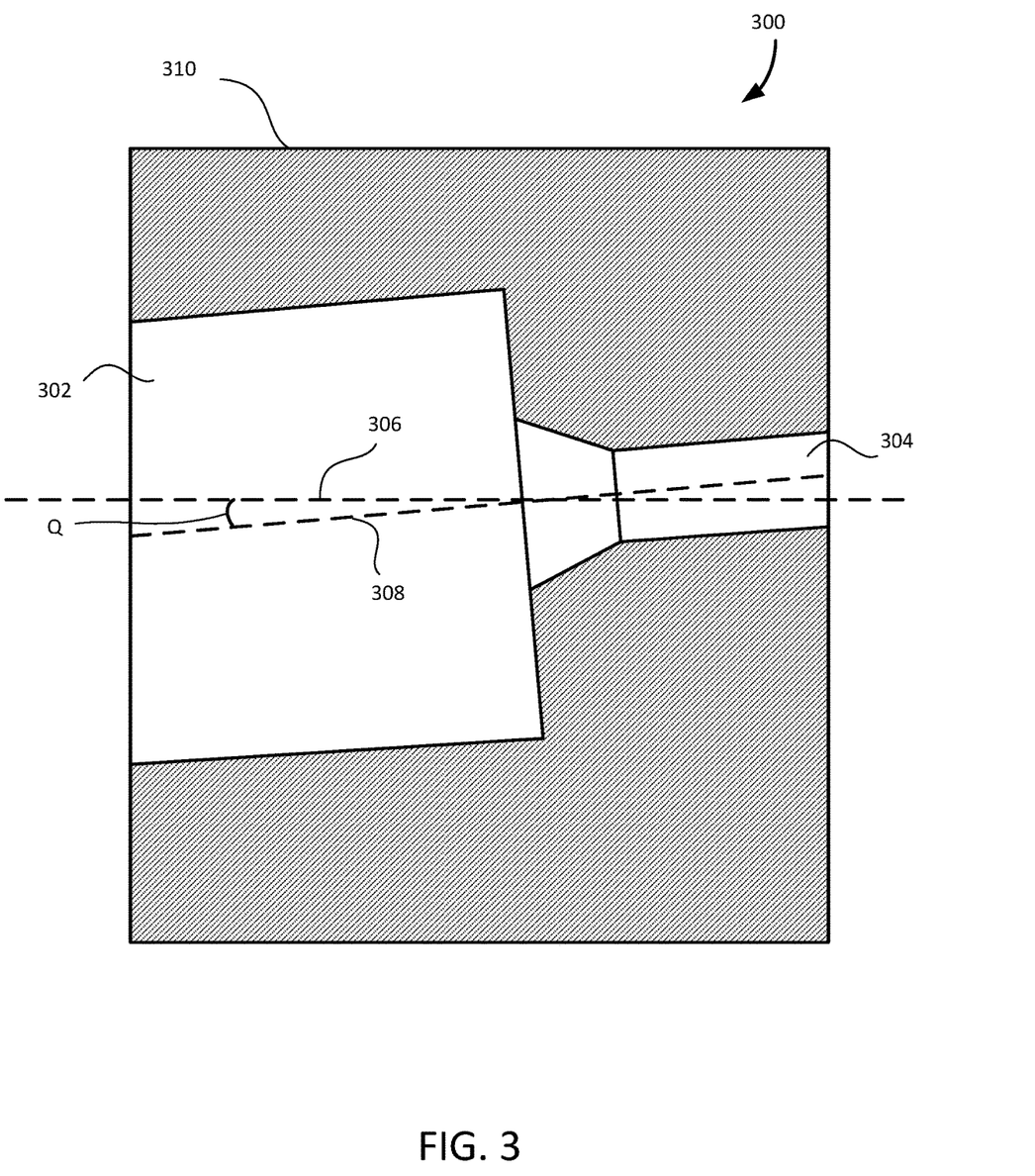
FIG. 3 illustrates a magnified view of an example angled port, according to an aspect of the present disclosure.

Additionally, the priming valve 200 includes angled ports in order to facilitate easier drainage of the priming valve 200. For instance, the port 202 and the port 204 may each be angled towards the port 206. FIG. 3 illustrates a magnified view 300 of an example angled port 302 with respect to a valve body 310, according to an aspect of the present disclosure. The example angled port 300 may be a magnified illustration of the port 202, though it should be appreciated that the description may apply to the port 204 as well. The port 302 may be angled at an angle Q relative to a horizontal plane 306 that is perpendicular to the valve's needle. An axis 308 through the center of the port 302 and the tube 304 is illustrated to demonstrate the angle Q.

In various instances, the angle Q may be greater than zero and equal to or less than five degrees. The angle Q of the port 302 helps facilitate valve draining because the angle Q creates a gravitational force that influences the fluid in the valve to flow out of the port 302 rather than remain within the valve. Fluid remaining in the valve increases the risk of biological growth that may contaminate the fluid. Therefore, the angle Q of the port 302 helps prevent fluid contamination. The angle Q also does not affect the valve's ability to prime fluid flowing through the valve because the angle Q is very small.

Accordingly, the configuration of the presently disclosed valve enables a needle-type valve to be used for applications that require a high level of fluid purity, such as pharmaceutical applications. For instance, the presently disclosed valve helps prevent biological growth within the valve and therefore helps prevent fluid contamination, which is not tolerated in high-purity fluid applications. By enabling a needle-type valve for high-purity fluid applications, the provided valve decreases design complexity and decreases production costs for high-pressure fluid systems utilized for high-purity fluid applications. The provided valve additionally helps decrease maintenance costs of such high-pressure fluid systems because individual components of the provided valve are easier to service and/or replace.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. A fluid processor, comprising:
   a pump having an inlet and an outlet;
   a reaction chamber adapted to effect at least one of high shear fields or impinging jet reactions on a fluid;
   a prime discharge line; and
   a priming valve including:
      a first port, a second port, and a third port in fluid communication, wherein the fluid enters the priming valve through the first port and exits through the second port,
      a needle that blocks a fluid pathway to the third port in a closed configuration and facilitates the fluid pathway in an open configuration, wherein the priming valve is configured such that air contained in the fluid flows along the fluid pathway to the third port and to the prime discharge line when the needle is in the open configuration, and
   wherein the fluid flows along a first fluid path from the pump to the first port, along a second fluid path from the first port to the second port, and along a third fluid path from the second port to the reaction chamber.

2. The fluid processor of claim 1, wherein the priming valve further includes:
   at least one washer surrounding a portion of the needle; and
   a sealing insert positioned between the at least one washer and the fluid pathway, configured to prevent fluid in the fluid pathway from contacting the at least one washer.

3. The fluid processor of claim 1, wherein the pump is configured to elevate a pressure of a fluid pumped through the priming valve to at least 5,000 psi and less than 50,000 psi when the needle is in the open configuration, while the needle, when in a closed configuration, prevents fluid flow to the third port.

4. The fluid processor of claim 1, wherein the first port is connected to the pump, the second port is connected to the reaction chamber adapted to effect at least one of high shear fields or impinging jet reactions on a fluid, and the third port is connected to the prime discharge line.

5. The fluid processor of claim 4, wherein the reaction chamber includes a plurality of microchannels that have minimum channel dimensions of 150 microns or less.

6. The fluid processor of claim 4, wherein the reaction chamber is adapted to effect shear fields between 80,000 $\text{sec}^{-1}$ to 10,000,000 $\text{sec}^{-1}$ on the fluid.

7. A priming valve, comprising:
   a valve body;
   a needle having a first configuration and a second configuration;
   a first port, recessed into a first external surface of the valve body, aligned with a longitudinal axis of the needle;
   a second port, recessed into a second external surface of the valve body, in fluid communication with the first port via a fluid pathway when the needle is in the first configuration and in the second configuration; and
   a third port, recessed into a third external surface of the valve body, in fluid communication with the first port and the second port via the fluid pathway when the needle is in the first configuration and is blocked from fluid communication with the first port and the second port when the needle is in the second configuration;
wherein the second port and the third port are angled not perpendicularly relative to a plan perpendicular to the longitudinal axis of the needle and not parallel to each other.

8. The priming valve of claim 7, wherein the second port and the third port are angled at an equal degree between zero and five degrees relative to the plane perpendicular to the longitudinal axis of the needle.

9. The priming valve of claim 7, wherein the needle is inserted into a first fluid pathway shared by the first port and the second port to the third port when in the second configuration, and a second fluid pathway between the first port and the second port remains unobstructed by the needle.

10. The priming valve of claim 9, wherein the first fluid pathway:
enters the priming valve through a first plane via the first port;
connects to the second port at a second plane parallel to the first plane; and
connects to the third port at a third plane parallel to the first plane, wherein the second plane is disposed between the first plane and the third plane.

11. The priming valve of claim 7, further comprising:
at least one washer surrounding a portion of the needle; and
a sealing insert positioned between the at least one washer and the first port, configured to prevent fluid passing through the priming valve from contacting the at least one washer.

12. The priming valve of claim 11, wherein the needle and the sealing insert are configured to maintain a seal that prevents the fluid from contacting the at least one washer when the fluid is at a pressure of at least 5,000 psi and less than 50,000 psi.

13. The priming valve of claim 11, wherein the needle, when in the second configuration, is configured to maintain a seal of the fluid pathway when the fluid is at a pressure of at least 5,000 psi and less than 50,000 psi.

14. A priming valve, comprising:
a valve body;
a first port, recessed into a first external surface of the valve body;
a second port, recessed into a second external surface of the valve body, located a first distance in a first direction from the first port and extending in a second direction, not parallel to the first direction;
a third port, recessed into a third external surface of the valve body, located a second distance in the first direction from the first port and extending in a third direction, not parallel to the first direction, wherein the second distance is greater than the first distance; and
a needle having an open configuration and a closed configuration,
wherein:
when the needle is in the open configuration, the first port, the second port, and the third port are in fluid communication;
when the needle is in the closed configuration, the first port and the second port are in fluid communication and the third port is in fluid communication with neither the first port nor the second port; and
wherein the second port and the third port are angled not perpendicularly relative to the first direction and not parallel to each other.

15. The priming valve of claim 14, further comprising:
at least one spacer surrounding a portion of the needle; and
a sealing insert positioned between the at least one spacer and a fluid pathway between the third port and the first port, configured to prevent fluid in the fluid pathway from contacting the at least one spacer.

16. The priming valve of claim 14, wherein the second port and the third port are angled at an equal degree between eighty-five and ninety degrees relative to first direction.

17. A fluid processor, comprising:
a pump, having an inlet and an outlet;
a reaction chamber adapted to effect at least one of high shear fields or impinging jet reactions on a fluid;
a prime discharge line;
a priming valve, comprising:
a needle, having a first configuration and a second configuration;
a valve body, defining:
a first external port;
a second external port;
a third external port;
a first internal tube in fluid communication with the first external port;
a second internal tube in fluid communication with the second external port; and
a third internal tube in fluid communication with the third external port; wherein
the first internal tube intersects the second internal tube, permitting fluid communication from the first external port to the second external port;
the first external port and a longitudinal axis of the needle are aligned;
the needle is disposed in a portion of the third internal tube;
the needle blocks the third external port from fluid communication with the first internal tube when the needle is in the first configuration, and permits fluid communication between the third external port and the first internal tube via the third internal tube when the needle is in the second configuration;
the outlet of the pump fluidly connected to the first external port;
the reaction chamber is fluidly connected to the second external port; and
the prime discharge line is fluidly connected to the third external port.

18. A priming valve, including:
a needle, having a first configuration and a second configuration;
a plurality of washers;
a sealing insert;
a valve body, defining:
a first port, recessed into a first external surface of the valve body;
a second port, recessed into a second external surface of the valve body;
a third port, recessed into a third external surface of the valve body;
a first internal tube in fluid communication with the first port;
a second internal tube in fluid communication with the second port; and
a third internal tube in fluid communication with the third port; wherein the first internal tube intersects the second internal tube, permitting fluid communication from the first port to the second port;

the first port and a longitudinal axis of the needle are aligned;

the needle is disposed in a portion of the third internal tube;

the needle blocks the third port from fluid communication with the first internal tube when the needle is in the first configuration, and permits fluid communication between the third port and the first internal tube via the third internal tube when the needle is in the second configuration;

at least one of the plurality of washers is disposed about a portion of the needle, and the sealing insert is disposed in a position which blocks fluid communication between the third internal tube and the at least one of the plurality of washers; and the second port and the third port are angled not perpendicularly relative to a plane perpendicular to the longitudinal axis of the needle and not parallel to each other.

19. The priming valve of claim 18, wherein the second port and the third port are angled at an equal degree between zero and five degrees relative to a plane perpendicular to the longitudinal axis of the needle.

* * * * *